Patented Jan. 27, 1953

2,626,962

UNITED STATES PATENT OFFICE 2,626,962

PRODUCTION OF HALOOLEFINIC COMPOUNDS

Louis Schmerling, Riverside, Ill., assignor to Universal Oil Products Company, Chicago, Ill., a corporation of Delaware No Drawing. Application May 17, 1949, Serial No. 93,838

17 Claims. (Cl. 260—648)

This application is a continuation-in-part of my co-pending application Serial Number 533,388 filed April 29, 1944, now abandoned.

This invention relates to the reaction of an acetylenic compound with a saturated halohydrocarbon containing at least three carbon atoms per molecule to produce higher boiling haloolefinic compounds. More specifically, the process is concerned with a method for condensing a saturated halohydrocarbon containing at least three carbon atoms per molecule with an acetylenic hydrocarbon in the presence of a catalyst to produce a haloolefin.

By the term "condensing" used in this specification and in the claims, I mean the process of chemically combining a saturated halohydrocarbon containing at least three carbon atoms per molecule with an acetylenic compound to produce a haloolefinic compound with a molecular weight equal to the sum of the molecular weights of said saturated halohydrocarbons and said acetylenic compound. In some cases, the haloolefin so formed from a saturated halohydrocarbon containing at least three carbon atoms per molecule and an acetylenic compound may react with a second molecular proportion of said saturated halohydrocarbon to yield a higher boiling saturated halohydrocarbon with a molecular weight equal to the sum of the molecular weights of said acetylenic compound and twice the molecular weight of said saturated halohydrocarbon, the latter containing at least three carbon atoms per molecule.

An object of this invention is the condensation of an acetylenic compound with a saturated halohydrocarbon containing at least three carbon atoms per molecule to form a haloolefinic compound.

Another object of this invention is the condensation of an acetylenic hydrocarbon with a saturated halohydrocarbon containing at least three carbon atoms per molecule to form a haloolefin.

A further object of this invention is the condensation of a monoacetylenic compound with a saturated monohalohydrocarbon containing at least three carbon atoms per molecule to form a monohalomonoolefinic compound.

A still further object of this invention is the condensation of a monoacetylenic hydrocarbon with a saturated monohalohydrocarbon containing at least three carbon atoms per molecule to form a monohalomonoolefin.

One specific embodiment of the present invention relates to a process which comprises reacting an acetylenic compound with a haloalkane containing at least three carbon atoms per molecule in the presence of a catalyst of the Friedel-Crafts type to form a haloolefinic compound as the principal product of the process.

Another embodiment of the present invention relates to a process which comprises reacting a monoacetylenic hydrocarbon with a monohaloalkane containing at least three carbon atoms per molecule in the presence of a catalyst of the Friedel-Crafts type.

A further embodiment of the present invention relates to a process which comprises reacting a monoacetylenic hydrocarbon with a monochloroalkane containing at least three carbon atoms per molecule in the presence of a halide catalyst of the Friedel-Crafts type.

A still further embodiment of the present invention relates to a process which comprises reacting a monoacetylenic hydrocarbon with a monohalonaphthene in the presence of a halide catalyst of the Friedel-Crafts type.

Another embodiment of the present invention relates to a process which comprises reacting a monoacetylenic hydrocarbon with a monochloronaphthene in the presence of a halide catalyst of the Friedel-Crafts type.

Acetylenic hydrocarbons utilizable in the present process comprises acetylene, monoalkyl, and dialkyl acetylenic hydrocarbons, vinylacetylene, and also cycloalkyl acetylenic hydrocarbons. Other acetylenic compounds may also be utilized in the process although not necessarily under the same conditions of operation as utilized in condensations of acetylenic hydrocarbons with haloalkanes and halonaphthenes. Such other acetylenic compounds include the propargyl halides (for example, 3-chloropropyne-1) propiolonitrile, etc.

Haloalkanes which are reacted with acetylenic compounds and particularly with acetylenic hydrocarbons, as herein set forth, comprise monohaloalkanes having at least three carbon atoms per molecule. Other monohaloalkanes such as methyl chloride and ethyl chloride which have fewer carbon atoms per molecule do not react with acetylenic compounds to form haloolefinic hydrocarbons, but as shown later in the examples of this specification, methyl chloride and ethyl chloride are recovered unchanged from such a condensation reaction mixture.

Monohaloalkanes having at least three carbon atoms per molecule are produced by the addition of a hydrogen halide to a monoolefinic hydrocarbon, said addition reaction being effected generally in the presence of a catalyst such as a metal halide of the Friedel-Crafts type, an acid such as sulfuric acid or phosphoric acid, etc. Such an addition of a hydrogen halide to an olefin results in the production of secondary alkyl halides from non-tertiary olefins containing at least three carbon atoms per molecule and in the formation of tertiary alkyl halides from tertiary olefins such as isobutylene, trimethylethylene, etc. The primary alkyl halides also utilizable in the present process for producing higher boiling alkyl halides are obtainable by other means such as the treatment of primary alcohols with a hydrogen halide in the presence of a suitable catalyst such as zinc chloride. Primary alkyl bromides may be obtained from a 1-alkene or α-olefin by addition of hydrogen bromide in the presence of peroxide or sunlight.

Monohaloalkanes having at least three carbon atoms per molecule in which the halogen has an atomic weight of from about 35 to about 80, namely monochloro and monobromoalkanes, are generally preferred for condensation with an acetylenic compound, but monoiodo and monofluoroalkanes may also be utilized although not necessarily under the same conditions of operation, particularly when different acetylenic hydrocarbons are also involved in the production of various higher molecular weight haloolefins.

Halocycloparaffins utilizable in the present process and which may also be referred to as halonaphthenes, include halocyclopentanes, halocyclohexanes, halodecalins, and other halogenated saturated cyclic compounds. The halogenated naphthene and particularly the chloronaphthene may be obtained from any suitable source. More specific examples of suitable halonaphthenes include 1-chloro-1-methylcyclopentane, 1-chloro-1-methylcyclohexane and 9-chlorodecahydronaphthalene. The first two compounds may be prepared from the corresponding alcohols which may be synthesized by the reaction of methyl magnesium chloride on cyclopentanone and cyclohexanone, respectively. The above-mentioned chlorodecalin may be obtained by the addition of hydrogen chloride to 9,10-octalin.

Another method for making tertiary halocycloparaffins consists in adding hydrogen halide to the double bond of a cycloolefin in which one of the hydrogen atoms joined to the doubly bonded carbon atom is substituted by an alkyl group, for example, the addition of hydrogen chloride to 1-methylcyclohexene-1 produces 1-chloro-1-methyl-cyclohexane.

Suitable catalysts for the process of the present invention comprise metal halides of the Friedel-Crafts type and particularly anhydrous ferric chloride, bismuth chloride, and zirconium chloride. More reactive metal halides such as aluminum chloride, aluminum bromide, etc., are also generally utilizable. The conditions of operation employed with the different Friedel-Crafts metal halides or metal halide mixtures are different depending upon the activity of each catalyst and other factors. These different catalytic materials which are employed are utilized as such or they are composited with one another or disposed on solid carriers or supporting materials to produce catalyst composites of desired activities. Suitable catalyst carriers or supports include both adsorptive and substantially non-adsorptive materials, for example, alumina, activated charcoal, crushed porcelain, raw and acid-treated clays, diatomaceous earth, pumice, firebrick, etc. The carriers should be substantially inert in the sense that substantially no interaction which is detrimental to the activity or selectivity of the catalyst composite occurs between the carrier and metal halides.

A haloalkane having at least three carbon atoms per molecule and particularly a monohaloalkane containing at least three carbon atoms per molecule, adds to the triple bond of an acetylenic compound to produce a halogenated olefinic compound with a molecular weight which is the sum of the molecular weights of the two organic compounds undergoing condensation. For example, I have found that the condensation of tertiary butyl chloride with methylacetylene produces 2-chloro-4,4-dimethylpentene-2 as illustrated by the following equation:

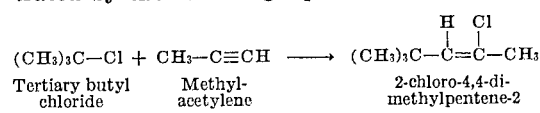

| Tertiary butyl chloride | Methylacetylene | 2-chloro-4,4-dimethylpentene-2 |

Reaction of the chloroheptene with a second molecule of tertiary butyl chloride yields a dichloro-undecane.

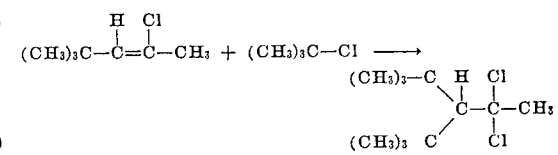

Tertiary butyl chloride undergoes similar condensation with dimethylacetylene and ethylacetylene to produce haloöctenes. Similarly, bromoöctenes may be obtained by the reaction of tertiary butyl bromide with dimethylacetylene and ethylacetylene.

The production of haloolefinic compounds as herein set forth is carried out by reacting a saturated halohydrocarbon, and particularly a monohaloalkane containing at least three carbon atoms per molecule, with an acetylenic compound, particularly an acetylenic hydrocarbon, in the presence of a catalyst of the Friedel-Crafts type at a condensation temperature of from about —30° to about 100° C. while maintaining a pressure sufficient to keep in liquid state a substantial proportion of the reactants. The reactions of the different halohydrocarbons with different acetylenic compounds are not necessarily effected with equal efficiency or under the same conditions of operation.

The different haloalkanes containing at least three carbon atoms per molecule also differ in their reactivities with acetylenic hydrocarbons. Because of cost considerations and relatively ease of operation, I prefer to employ chloroalkanes and chloronaphthenes as the haloalkane and halonaphthalene starting material for my process. The several general groups of monohaloalkanes such as primary, secondary, and tertiary haloalkanes are utilizable in my process although not necessarily under the same conditions of operation.

The reaction of a saturated halohydrocarbon having at least three carbon atoms per molecule with an acetylenic compound, particularly an acetylenic hydrocarbon in the presence of a catalyst may be carried out using either batch or continuous operation. A hydrogen halide as hydrogen chloride or hydrogen bromide may sometimes be introduced with the acetylenic hydrocarbon and haloalkane charged. Thus, in batch type operation, desired proportions of a monohaloalkane having at least three carbon atoms per molecule and a monoacetylenic hydrocarbon are introduced to a suitable reactor containing the Friedel-Crafts type catalyst, as such or composited with a carrier, and the resultant commingled materials are contacted until a substantial proportion of the reactants are converted into the desired monohaloolefin and dihaloalkane. The reaction mixture, after separation from the catalyst, is fractionated to separate unconverted acetylenic hydrocarbon and unconverted haloalkane having three carbon atoms per molecule from the higher boiling haloolefin and a small amount of dihaloalkane also formed in the process. The recovered acetylenic hydrocarbon and haloalkane having at least three carbon atoms per molecule may be used in another run.

Continuous operations may be carried out by directing a mixture of an acetylenic hydrocarbon and a haloalkene, particularly a monohaloalkane, which is generally referred to as an alkyl halide, through a reactor of suitable design containing a stationary bed of granular or supported Friedel-Crafts type catalyst. In this type of treatment, the operating conditions may be adjusted suitably and may differ somewhat from those used in batch operation. Thus, when a mixture of monohaloalkane, having at least three carbon atoms per molecule, and an acetylenic hydrocarbon is passed, for example, through a tubular reactor containing ferric chloride supported by granular porcelain, the formation of a higher boiling haloolefin may be effected by using a higher temperature and shorter time of contact than when treating a similar reaction mixture with the same catalyst in a batch type reactor, such as an autoclave provided with stirring means.

In some cases, it is advisable to commingle the charged halohydrocarbon containing at least three carbon atoms per molecule and acetylenic hydrocarbon with a substantially inert solvent such as a paraffinic hydrocarbon or a nitroparaffin and then to effect the condensation in the presence of this added solvent. Obviously, this solvent should be one which does not itself undergo undesirable reaction in the presence of the catalyst under the operating conditions utilized.

The haloolefins and polyhalohydrocarbons formed in the process may be utilized as such or as intermediates in the synthesis of other organic compounds. Thus, the haloolefins may be converted into alcohols, aldehydes, ketones, olefins, and paraffins, while dihaloalkanes and other polyhalohydrocarbons produced in my process may be used in the preparation of resins and plastics, for example, by reaction with an aromatic compound in the presence of a Friedel-Crafts catalyst.

The reaction conditions employed in my process depend upon the reactants and also upon the nature and activity of the catalyst, and include a reaction temperature of from about $-30°$ to about $100°$ C. which is applicable with Friedel-Crafts catalyst although temperatures of from about $-30°$ to about $+30°$ C. are usually employed in the presence of the more active Friedel-Crafts catalysts such as aluminum chloride and ferric chloride, while somewhat higher temperatures of from about $0°$ to $100°$ C. are generally used when employing less active catalysts such as bismuth chloride or zinc chloride. When more active catalysts such as aluminum chloride and ferric chloride are employed at relatively high operating temperatures, as at $30°$ to $100°$ C., the charging rate of the reaction mixture is maintained sufficiently rapid to quickly remove the reaction products from the catalytic zone and thus avoid undesired decomposition reactions. Also when the less active catalysts such as bismuth chloride and zinc chloride are used at the lower temperatures in the indicated operating range, the reaction time must be prolonged in order to obtain substantial condensation of acetylenic compounds and monohalohydrocarbon containing at least three carbon atoms per molecule.

The following examples illustrate the character of results obtained in specific embodiments of the present process, although the data presented are not introduced with the intention of unduly restricting the scope of the invention.

*Example I*

In one run, a solution of 100 grams of normal propyl bromide in 100 grams of n-pentane was cooled to $-30°$ C. and 10 grams of aluminum chloride was added thereto. Acetylene was passed into the well-stirred mixture while the temperature was permitted to rise gradually to the point of substantial absorption of the acetylene. Good absorption occurred when the temperature reached about $10$–$15°$ C. The reaction mixture was kept at this range of temperature for about 1.5 hours while the acetylene was passed in. The upper layer of product was separated from the catalyst which was a thick sludge weighing 45 grams. Distillation of the washed and dried upper layer yielded 3 grams of compound boiling chiefly at $38$–$40°$ C. at about 24 mm. pressure ($118$–$122°$ at atmospheric pressure). This material, which had a density greater than that of water, was a bromopentene as proven by its ultimate analysis; it contained 39.24% carbon, 6.31% hydrogen, and 54.85% bromine. The respective values of carbon, hydrogen and bromine calculated for the formula $C_5H_9Br$ are 40.29, 6.09, and 53.62%. The bromopentene consisted chiefly of 1-bromo-3-methyl-1-butene. There was also obtained 3 to 4 grams of a product formed by the reaction of acetylene with two molecular proportions of normal propyl bromide. The unreacted normal propyl bromide was recovered unchanged.

On the other hand, when methyl chloride or ethyl chloride was used as the alkyl halide, the product was a very high molecular weight solid polymer of acetylene known as cuprene. On the contrary, no cuprene-like reaction product was obtained in the run with normal propyl bromide. Thus, it is concluded that while alkyl halides containing at least three carbon atoms per molecule may be condensed with acetylene, those containing one or two carbon atoms do not so condense.

*Example II*

A mixture of 50 grams of tertiary butyl chloride, 20 grams of methyl acetylene, and 8 grams of bismuth chloride was sealed in a rotatable steel autoclave which was then charged with nitrogen to 30 atmospheres pressure. The autoclave was rotated at room temperature for 2 hours and then at $60°$ C. for 2 hours. After cooling there was recovered from the autoclave 62 grams of a deep blue liquid product and 13 grams of a brown semi-solid catalyst layer. Also, 1 gram of condensable gas was obtained. The liquid product was washed, dried, and distilled. From the liquid product, 22 grams of tertiary butyl chloride was recovered and there was obtained 14 grams of a condensation product boiling mainly at $49$–$51°$ C. at a pressure of 40 mm. of mercury, this boiling point corresponding to about $133$–$135°$ C. at atmospheric pressure. The 14 grams of condensation product corresponded to a yield of 35% of the theoretical based upon the tertiary butyl chloride consumed in the reaction. This condensation product had the following properties: B. P. 49–51° C. at 40 mm.; $n_D^{20}$ 1.4360; $d_4^{20}$ 0.8833; molecular refraction, 39.2. The molecular refraction calculated for $C_7H_{13}Cl$ is 38.9. This product was 2-chloro-4,4-dimethylpentene-2. There was also obtained in this run about 8 grams of material boiling between 200° and 240° C. and having a refractive index range of from 1.46 to 1.48. This material consisted principally of dichloro-undecane produced by the addition of tertiary butyl chloride to the chloroheptene formed as the primary product.

Example III

Other runs utilizing t-butyl chloride and methylacetylene but carried out in the presence of aluminum chloride catalyst yielded products similar to those obtained in Example II in the presence of bismuth chloride catalyst. Thus when 17.5 grams of methylacetylene was passed during 40 minutes into a mixture of 50 grams of tertiary butyl chloride, 20 grams of n-pentane (solvent) and 5 grams of aluminum chloride in a reactor provided with a stirrer and maintained at −30° C., a product was obtained containing 6 grams of chloroheptene boiling at 49–52° C. at 40 mm. pressure and 7 grams of higher boiling material. In a similar run made at a temperature of from −10° to 0° C., a product was formed containing 8 grams of the chloroheptene and 14 grams of higher boiling material, most of which boiled between 230° and 240° C. and had a refractive index of 1.480.

Example IV

In another run, acetylene was bubbled through a well-stirred mixture of 50 grams of tertiary butyl chloride and 4 grams of aluminum chloride at 0° C. There was obtained 5 grams of the condensation product, 1-chloro-3,3-dimethyl-butene-1, which boiled from 100° to 110° C.; had a refractive index, $n_D^{20}$, of 1.4198; $d_4^{20}$, of 0.8571; and a molecular refraction of 34.3. The molecular refraction calculated for $C_6H_{11}Cl$ is 34.3.

I claim as my invention:

1. A process for producing a haloolefinic compound which comprises reacting a saturated halohydrocarbon containing at least three carbon atoms per molecule with an acetylenic compound in the presence of a Friedel-Crafts catalyst at a temperature of from about −30° C. to about 100° C., and recovering a haloolefinic compound having a molecular weight at least equal to the sum of the molecular weights of the aforesaid reactants.

2. A process which comprises reacting a saturated chlorohydrocarbon containing at least three carbon atoms per molecule with an acetylenic compound in the presence of a Friedel-Crafts catalyst at a temperature of from about −30° C. to about 100° C., and recovering a chloroolefinic compound having a molecular weight at least equal to the sum of the molecular weights of the aforesaid reactants.

3. A process which comprises reacting a saturated halohydrocarbon containing at least three carbon atoms per molecule with an acetylenic hydrocarbon in the presence of a Friedel-Crafts catalyst at a temperature of from about −30° C. to about 100° C., and recovering a haloolefinic compound having a molecular weight at least equal to the sum of the molecular weights of the aforesaid reactants.

4. A process which comprises reacting a haloalkane containing at least three carbon atoms per molecule with a monoacetylenic compound in the presence of a Friedel-Crafts catalyst at a temperature of from about −30° C. to about 100° C., and recovering a haloolefinic compound having a molecular weight at least equal to the sum of the molecular weights of the aforesaid reactants.

5. A process which comprises reacting a monohaloalkane containing at least three carbon atoms per molecule with an acetylenic hydrocarbon in the presence of a Friedel-Crafts catalyst at a temperature of from about −30° C. to about 100° C., and recovering a haloolefinic compound having a molecular weight at least equal to the sum of the molecular weights of the aforesaid reactants.

6. A process which comprises reacting a monohaloalkane containing at least three carbon atoms per molecule with a monoacetylenic compound in the presence of a Friedel-Crafts catalyst at a temperature of from about −30° C. to about 100° C., and recovering a haloolefinic compound having a molecular weight at least equal to the sum of the molecular weights of the aforesaid reactants.

7. A process which comprises reacting a halonaphthene with a monoacetylenic compound in the presence of a Friedel-Crafts catalyst at a temperature of from about −30° C. to about 100° C., and recovering a haloolefinic compound having a molecular weight at least equal to the sum of the molecular weights of the aforesaid reactants.

8. A process which comprises reacting a monohalonaphthene with an acetylenic hydrocarbon in the presence of a Friedel-Crafts catalyst at a temperature of from about −30° C. to about 100° C., and recovering a haloolefinic compound having a molecular weight at least equal to the sum of the molecular weights of the aforesaid reactants.

9. A process which comprises reacting a monohalonaphthene with a monoacetylenic hydrocarbon in the presence of a Friedel-Crafts catalyst at a temperature of from about −30° C. to about 100° C., and recovering a haloolefinic compound having a molecular weight at least equal to the sum of the molecular weights of the aforesaid reactants.

10. A process which comprises reacting a monohaloalkane having at least three carbon atoms per molecule with a monoacetylenic hydrocarbon in the presence of a Friedel-Crafts catalyst at a temperature of from about −30° C. to about 100° C., and recovering a haloolefinic compound having a molecular weight at least equal to the sum of the molecular weights of the aforesaid reactants.

11. A process which comprises reacting a tertiary butyl halide with a monoacetylenic hydrocarbon in the presence of a Friedel-Crafts catalyst at a temperature of from about −30° C. to about 100° C., and recovering a haloolefinic compound having a molecular weight at least equal to the sum of the molecular weights of the aforesaid reactants.

12. A process which comprises reacting tertiary butyl chloride with a monoacetylenic hydrocarbon in the presence of a Friedel-Crafts catalyst at a temperature of from about −30° C. to about 100° C., and recovering a haloolefinic compound having a molecular weight at least equal to the sum of the molecular weights of the aforesaid reactants.

13. A process which comprises reacting tertiary butyl chloride with acetylene in the presence of a Friedel-Crafts catalyst at a temperature of from about —30° C. to about 100° C., to form 1-chloro-3,3-dimethyl-butene-1, and recovering the last-named compound.

14. A process which comprises reacting tertiary butyl chloride with methylacetylene in the presence of a Friedel-Crafts catalyst at a temperature of from about —30° C. to about 100° C., to form 2-chloro-4,4-dimethylpentene-2 and recovering the last-named compound.

15. A process which comprises reacting a tertiary alkyl halide with an acetylenic hydrocarbon in the presence of an aluminum chloride catalyst at a temperature of from about —30° C. to about +30° C., and recovering a haloolefinic compound having a molecular weight at least equal to the sum of the molecular weights of the aforesaid reactants.

16. A process which comprises reacting a tertiary alkyl halide with an acetylenic hydrocarbon in the presence of a bismuth chloride catalyst at a temperature of from about 0° C. to about 100° C., and recovering a haloolefinic compound having a molecular weight at least equal to the sum of the molecular weights of the aforesaid reactants.

17. A process which comprises reacting a tertiary alkyl halide with an acetylenic hydrocarbon in the presence of a Friedel-Crafts metal halide catalyst at a temperature of from about —30° C. to about 100° C., and recovering a haloolefinic compound having a molecular weight at least equal to the sum of the molecular weights of the aforesaid reactants.

LOUIS SCHMERLING.

REFERENCES CITED

The following references are of record in the file of this patent:

FOREIGN PATENTS

| Number | Country | Date |
|---|---|---|
| 695,125 | France | Sept. 23, 1930 |